A. EHRLICH.
RAILWAY VEHICLE WITH ELECTROMAGNETIC ADHERENCE AND SHIFTABLE AXLES.
APPLICATION FILED SEPT. 11, 1911.
1,043,574.
Patented Nov. 5, 1912.
2 SHEETS—SHEET 1.
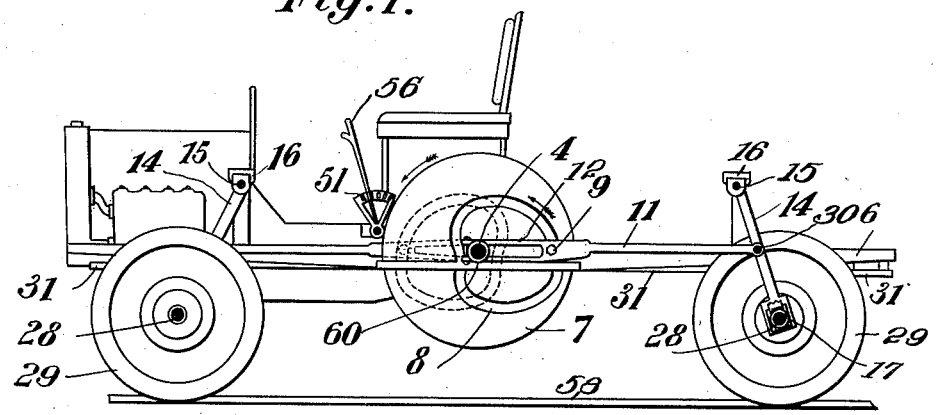
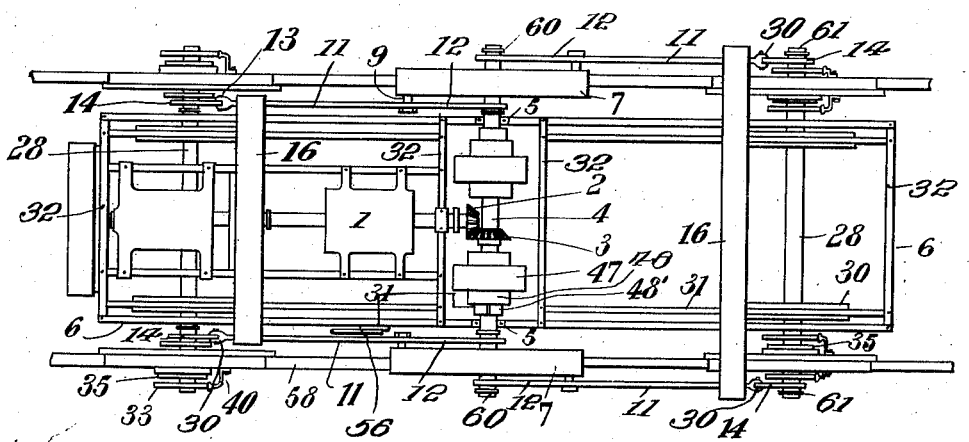
Witnesses:
Inventor:
Adolf Ehrlich
By ____ Attorney

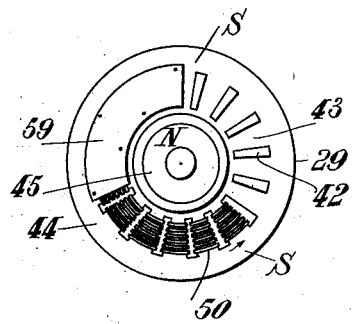
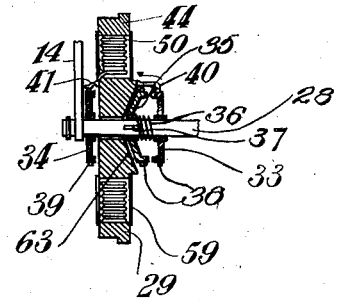
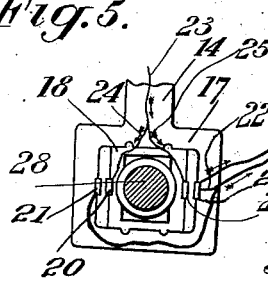

UNITED STATES PATENT OFFICE.

ADOLF EHRLICH, OF BUDAPEST, AUSTRIA-HUNGARY.

RAILWAY-VEHICLE WITH ELECTROMAGNETIC ADHERENCE AND SHIFTABLE AXLES.

1,043,574.  Specification of Letters Patent.  Patented Nov. 5, 1912.

Application filed September 11, 1911. Serial No. 648,711.

*To all whom it may concern:*

Be it known that I, ADOLF EHRLICH, a subject of the Emperor of Austria-Hungary, and resident of Budapest, Austria-Hungary, have invented certain new and useful Improvements in Railway-Vehicles with Electromagnetic Adherence and Shiftable Axles, of which the following is a specification.

This invention relates to a vehicle which advances in a step by step movement by means of wheels rolling freely forward on railway rails and adhering to them when braked, the wheels which periodically roll forward being converted by the electric current which temporarily flows through them into a ring shaped electromagnet and attracted during this time by the railway rail and braked in an electromagnetic manner by means of a conical iron pulley adapted to slide on the axle of the wheels.

The wheels which roll forward in an intermittent manner are positioned on axles which are shifted together alternately forward and then again backward with reference to the vehicle, the body of the latter itself rolling forward in an uninterrupted manner over rollers arranged on the movable axles through the instrumentality of rails secured to its bottom part.

The axles which are alternately pushed forward in a step by step movement are moved by connecting rods which are moved alternately forward in a rectilinear manner with a relatively great uniform speed and thereafter backward with a speed which is made smaller but uniform, the said actuation of the connecting rods being positively brought about by means of grooves provided eccentrically in a rotating disk these grooves being asymmetrically heart shaped and formed by two involutes of a circle of different sizes. The said connecting rods push the body of the vehicle forward over the rollers of both axles during that space of time during which they move the axle connected therewith backward while the wheels carried by the said axles are braked by electromagnetic means and attracted by the railway track, the wheels which are thus held stationary on the track serving as a fulcrum during the said forward motion.

The connecting rods move the axles by means of levers the lower end of each of which surrounds the axle to be shifted and has been built so as to form an automatic interrupting device for the current.

As owing to the particular heart shape of the cam groove the connecting rods move much quicker forward than backward and as the actuation proper of the vehicle is effected only by the latter motion, there is a space of time at every revolution of the disk during which both axles serve as bearing points for the propulsion of the vehicle and in the meantime the entire weight of the vehicle is used as an adherence load and a uniform and uninterrupted motion of the vehicle is obtained.

The object of this invention is to provide a vehicle for use on any railway and having as great as possible an adherence and in which in place of the saving weight a part of the available motive power can be used for increasing the adherence.

In the accompanying drawings: Figure 1 shows a side elevation view of a locomotive driven by a petrol motor. Fig. 2 is a top plan view of same; Fig. 3 shows the construction of the wheel rolling in an intermittent manner on the railway track; Fig. 4 is a section of this wheel; Fig. 5 shows the lower part of the lever moving the shiftable axle, together with the automatic contact pieces; Fig. 6 shows the cut-in and cut-out device actuated by the driver. Fig. 7 shows a section of the fly wheel which controls the motion of the connecting rod; Fig. 8 shows both sides of the fly wheel disk in a juxtaposed position. The parts of arcs designated by letters correspond to the various periods of the revolution of the disk; the quadrants designated by the same Roman figures are positioned in opposition to each other on different sides of the disk; the arrows designate the direction of rotation of the disk. Fig. 9 is a diagrammatic view of the wiring used herewith.

The motor 1 rotates by means of bevel wheels 2 and 3 the shaft 4 carried by bearings 5 secured to the framework. Secured to the shaft 4 are the fly wheel disks 7 which are provided on both sides with eccentric grooves 8 having an asymmetric heart shape and shifted to 180 degrees with reference to each other. The halves of these grooves are evolutes of circles having different dimensions, the larger half leading the connecting rod 11 slowly but uniformly backward, while the smaller half moves the connecting rod forward with a relatively rapid motion.

The connecting rods 11 carry on their side facing the fly wheel disk 7 pins 9 which are surrounded by rollers 10 which project into the grooves 8. The part of the connecting rods projecting beyond the pin 9 is forked at 12 and surrounds at its end the shaft 4, a ring 60 preventing it from slipping off sidewise. The free end of the connecting rod 11 is hingedly connected by means of a pivot 30 to the central part of the lever 14. The latter is hingedly connected at its upper end by means of pivots 15 with the cross beam 16 of the frame 6 so as to be adapted to swing forward and backward; the lower end of the lever surrounds by means of the yoke 17, 18 the free end of the shiftable axle 28 and is prevented from sliding off sidewise by the ring 61.

Secured to the shiftable axle 28 are the two wheels 29 which roll forward in an intermittent manner on the railway track 58; the axle 28 carries besides two wheels 30 which are grooved at their free edge, hang freely downward and bear their upper part against rails 31. The latter are secured to the beams 32 of the framework 6 and move in an uninterrupted manner along the wheels 30.

The axle 28 carries besides the wheels 29, 30 the outer disks 34 and the inner disks 33 the first named of which carry at their circumference the insulated copper contact ring 39 while the inner disks 33 are provided with the contact ring 38 (Fig. 4).

Positioned on the axle 28 between the disk 33 and the wheel 29 is the disk 35 which is adapted to slide in the longitudinal direction but is prevented by the key 37 from rotating on the axle 28. The said disk 35 is provided on the side facing the wheel 29 with a cone shaped surface and is forced against the disk 33 by the spiral spring 36. The wheel 29 is provided on the side facing the disk 35 with a cone shaped depression 63 which corresponds to the cone shape of the disk 35.

The central part of the wheel disk 29 is interrupted by slots 42 which are radially disposed. Between each two slots webs 43 are provided which connect the wheel rim 44 with the hub 45; the latter is hollowed out in a cone like manner at 63 on its side facing the disk 35. The webs 43 are surrounded by insulated wire coils 50 which are connected in series relation. The cover 59 protects the coils from outside influences.

Rotating on the shaft 4 of the fly wheel disks 7 are the armature 48 and the commutator 48' of the dynamo machine 47. The electric current generated is conveyed to the ring shaped sliding contact 38 (Fig. 4) and from thence by the sliding contact 40 into the windings 50 where it generates such a magnetic effect that the wheel rim 44 forms for example a ring shaped south pole and the wheel hub 45 the north pole. The magnetic pole 44 at the periphery of the wheel is attracted by the railway track 58 while at the same time the other pole 45 pulls the conical disk 35 into the conical depression 63 whereby an energetic braking action is produced. As readily seen the wheels 29 are at the same time prevented from rotating and from sliding forward as long as the electric current flows through the wire windings 50.

From the windings 50 the current is conveyed by means of the sliding contact 41 on the ring 39 of the disk 34 and from here flows through the wire 23 to the lever 14, here the conductor is divided into two parts 24, 25; the different branches are connected at their ends with contact members 20 and 19 respectively which latter are arranged on the smaller frame 18 in which the end of axle can move upwardly and downwardly; this frame surrounds by its vertical lateral pieces the axle 28 while it is adapted to slide sidewise in the frame shaped lower end part 17 of the lever 14 (Fig. 5).

The vertical branches of the frame 17 (Fig. 5) are provided with contact members 21, 22 corresponding to the contacts 19, 20 of the smaller frame 18. When the oscillating levers move forward the pairs of contacts 20, 21 touch each other while during the backward motion the pairs of contacts 19, 22 come into contact with each other.

The contacts 21 and 22 are connected with the contacts 52, 53, 54, 55 of the make and break device or switch 51 (Fig. 6) by means of wires 26, 27, which are each divided in the make and break device into two branches.

The switch lever 56 carries a large contact piece 56' which according to its position can be connected with the end of the conductor 26 when it is positioned at the contact 55, or with the end of the conductor 27 when it is positioned at the contact 52 or with both conductors when it is positioned at the ends 53 and 54 of the branches of said conductors.

In the first case the electric circuit is closed only when the oscillating lever 14 moves backward; in the second case only when it moves forward and in the third case during the forward as well as during the backward motion of the oscillating lever 14. As a consequence the vehicle moves forward or backward while it stops in the third case owing to the permanent braking action produced.

The current is conveyed back from the contact lever 56 to the generator by means of the conductor 57'.

When the electromagnetic force fixes the front wheels 29, the front connecting rods 11 pull the frame 6 forward over the wheels 30; but as soon as the electromagnetic braking action ceases at the front wheels and the rear wheels are magnetically braked, the rear connecting rods 11 bring the frame 6 forward so that the latter is advanced in an uninterrupted manner.

When the switch lever 56 is moved from the contact 52 on the contact 55, the circuit can only be closed by means of the conductor 27 and the contact 20 whereby the direction of running is reversed.

Having now fully described my said invention, what I claim and desire to secure by Letters Patent, is:

1. In a motor vehicle, a body, wheel axles extending transversely of said body and shiftable longitudinally thereof, wheels on said axles, and means to successively rotate the wheels on said axles.

2. In a motor vehicle, a body, wheel axles extending transversely of said body and shiftable longitudinally thereof, wheels on said axles, means to periodically arrest the rotation of a given pair of said wheels and means to rotate the remaining wheels during said periodical arrest.

3. In a motor vehicle, a body, a front axle, a rear axle, wheels on said axles, and means to alternately reciprocate said axles with reference to said body.

4. In a motor vehicle, a body, front wheels therefor, rear wheels therefor, means to rotate said wheels, and means to alternately check the rotation of said front and rear wheels.

5. In a motor vehicle, front and rear shiftable axles, a body, means to alternately reciprocate said axles with reference to said body, wheels carried on said axles, means to rotate said wheels and means to check the rotation of the wheels on one axle during the movement of the remainder of said wheels.

6. In a motor vehicle, a body, a plurality of axles extending transversely of said body and reciprocable longitudinally thereof, mechanical means to successively reciprocate said axles, wheels on each of said axles, and electro-magnetic means for checking the rotation of the wheels on one axle during the reciprocation of the remainder.

7. The combination with a magnetic track; of a motor vehicle provided with wheels of like character, and means for alternately polarizing said wheels with respect to the track.

8. The combination with a paramagnetic track, of a motor vehicle adapted to run thereover, provided with wheels adapted to a like magnetization and means for successively magnetizing said wheels.

9. The combination of a paramagnetic track; of a motor vehicle having a body and transversely extending axles, paramagnetic wheels carried by said axles, mechanical means for alternately reciprocating said axles, wheels on said axles, and electro-magnetic means for successively exciting segments of said wheels to a polarity opposite said track.

In testimony whereof I have hereunto set my hand in presence of two witnesses.

ADOLF EHRLICH.

Witnesses:
EMILE VAN WANRECH,
C. VAN VELSEN.